(12) United States Patent
Pierpont et al.

(10) Patent No.: US 9,328,693 B2
(45) Date of Patent: May 3, 2016

(54) PISTON, ENGINE AND OPERATING METHOD FOR REDUCED PRODUCTION OF PARTICULATE MATTER

(71) Applicant: Electro-Motive Diesel, Inc., LaGrange, IL (US)

(72) Inventors: David A. Pierpont, Dunlap, IL (US); John P. Timmons, Chillicothe, IL (US); Michael B. Goetzke, Orland Park, IL (US); Kenneth M. Sinko, Oak Park, IL (US); Reddy Pocha Siva Sankara, Lisle, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 255 days.

(21) Appl. No.: 13/944,523

(22) Filed: Jul. 17, 2013

(65) Prior Publication Data

US 2015/0020767 A1 Jan. 22, 2015

(51) Int. Cl.
*F02B 23/06* (2006.01)
*F02F 3/00* (2006.01)

(52) U.S. Cl.
CPC ........... *F02F 3/0076* (2013.01); *F02B 23/0672* (2013.01); *F02B 23/0693* (2013.01); *F02B 23/0687* (2013.01); *F02B 2275/14* (2013.01)

(58) Field of Classification Search
CPC ..... Y02T 10/125; Y02T 10/123; Y02T 10/36; F02B 23/0672; F02B 23/0621; F02B 23/0669; F02B 23/06; F02B 23/0693; F02B 23/0696; F02B 2275/14; F02F 3/26; F02F 2001/247; F02D 21/08; F02D 41/0025; F02M 25/0727

USPC .......................................................... 123/294
See application file for complete search history.

(56) References Cited

U.S. PATENT DOCUMENTS 5,970,946 A    10/1999    Shea et al.
6,314,933 B1    11/2001    Iijima et al.
(Continued)

FOREIGN PATENT DOCUMENTS

CN    102562350    7/2012
DE    102009050265    9/2010
(Continued)

OTHER PUBLICATIONS

Karch et al., Piston Having Combustion Bowl Shaped to Balance Combustion Efficiency and Emission Properties, U.S. Appl. No. 13/892,612, filed May 13, 2013, 43 pages, United States.
(Continued)

*Primary Examiner* — Lindsay Low
*Assistant Examiner* — Gonzalo Laguarda
(74) *Attorney, Agent, or Firm* — Baker & Hostetler LLP

(57) ABSTRACT

A piston for reduced production of particulate matter during combustion of a fuel directly injected after a top dead center position includes a piston body defining a piston body diameter of about 263 mm, and a combustion face upon the first axial body end. The combustion face includes a combustion bowl, and an annular piston rim extending circumferentially around the combustion bowl. Inner and outer rim surfaces together comprise a horizontal width of the rim in a ratio of about 1:1 to about 2:1. The inner rim surface includes a chamfer sloping from about 9° to about 11°, such that a profile of the rim is relieved to limit deflection by the piston of the directly injected fuel toward a cylinder wall.

20 Claims, 3 Drawing Sheets

(56) References Cited

U.S. PATENT DOCUMENTS

| | | | |
|---|---|---|---|
| 6,705,273 B1 * | 3/2004 | Liu et al. | 123/263 |
| 6,732,703 B2 | 5/2004 | Eckerle et al. | |
| 6,799,551 B2 * | 10/2004 | Nakakita et al. | 123/295 |
| 6,966,294 B2 | 11/2005 | Eckerle et al. | |
| 7,025,031 B2 | 4/2006 | Mahakul et al. | |
| 7,096,848 B2 | 8/2006 | Ono et al. | |
| 7,131,418 B2 | 11/2006 | Wieland | |
| 7,156,069 B2 | 1/2007 | Ono et al. | |
| 7,210,448 B2 * | 5/2007 | Stanton et al. | 123/298 |
| 7,431,012 B1 | 10/2008 | Glenn et al. | |
| 7,942,126 B2 * | 5/2011 | Zoller | 123/298 |
| 8,276,563 B2 * | 10/2012 | Quigley et al. | 123/274 |
| 8,327,822 B2 | 12/2012 | Asai et al. | |
| 2005/0166890 A1 | 8/2005 | Wickman et al. | |
| 2009/0007879 A1 * | 1/2009 | Hutmacher | 123/193.6 |
| 2011/0253096 A1 * | 10/2011 | Easley et al. | 123/294 |
| 2013/0239925 A1 * | 9/2013 | Karch et al. | 123/294 |
| 2013/0319372 A1 * | 12/2013 | Gladden et al. | 123/435 |

FOREIGN PATENT DOCUMENTS

| | | |
|---|---|---|
| DE | 102009025404 | 1/2011 |
| FR | 2947009 | 12/2010 |

OTHER PUBLICATIONS

Ness et al., Piston Having Combustion Bowl and Engine Using Same, U.S. Appl. No. 13/892,396, filed May 13, 2013, 22 pages, United States.

* cited by examiner

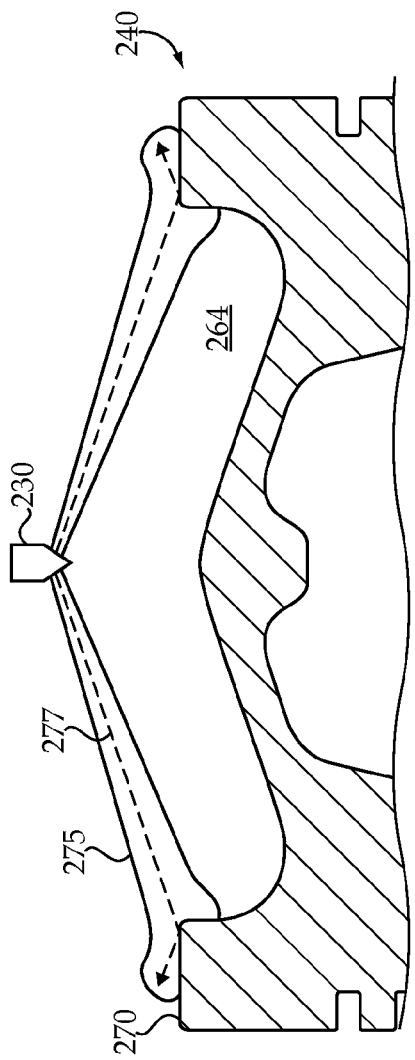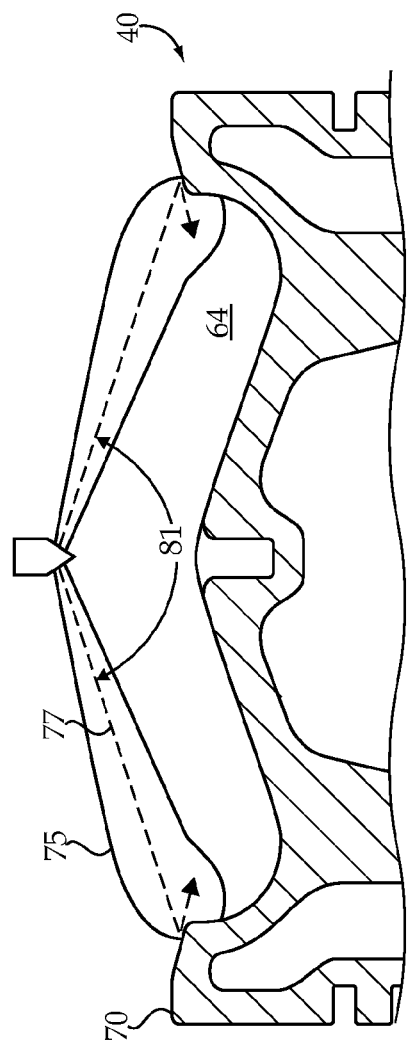
Fig.4
Fig.5

PISTON, ENGINE AND OPERATING METHOD FOR REDUCED PRODUCTION OF PARTICULATE MATTER

TECHNICAL FIELD

The present disclosure relates generally to a piston for an internal combustion engine, and relates more particularly to a profile of a piston combustion face limiting deflection of directly injected fuel toward a wall of a cylinder bore.

BACKGROUND

A wide variety of operating strategies, and component geometries are known in the field of internal combustion engines. Engineers have experimented for decades with different ways to operate fueling, exhaust, intake, and other engine systems, and different ways to shape and proportion engine components. One motivation behind such experimentation has been balancing the often competing concerns of reducing certain emissions in the engine exhaust, and optimizing efficiency. Internal combustion engines typically burn air and a hydrocarbon fuel. Combustion of the fuel and air produces exhaust from the internal combustion engine, which can include a variety of compounds and materials such as soot, ash, unburned hydrocarbons, water, carbon dioxide, carbon monoxide, and various other organic and inorganic species.

In recent years, the reduction in emissions of oxides of nitrogen, collectively referred to as "NOx", and the reduction of particulate matter which generally includes soot and ash, has been of particular focus in internal combustion engine research. Reducing these undesirable exhaust constituents often comes at the expense of efficiency properties such as fuel efficiency and/or attainable engine speed or power. Moreover, strategies that reduce NOx can increase particulate matter, and vice versa. As noted above, component shapes and operating parameters of the engine have been varied in almost innumerable ways over the years. One area of particular focus has involved attempts to shape a piston combustion face in such a way that certain exhaust emissions are reduced, without sacrificing efficiency.

One common piston design directed to reducing emissions without sacrificing efficiency unduly, includes a combustion bowl defined by the combustion face of the piston which is exposed to and defines a portion of the engine combustion chamber. It is believed that a combustion bowl may affect the flow and combustion properties of gases and atomized liquid fuel during a combustion event in such a way that the make-up of the combustion products can be tailored for various purposes.

Currently, despite the development of numerous research and commercial designs for piston combustion bowls, the science of combustion as it relates to bowl shape and piston rim shape during a combustion event is not fully understood. It is well known that even relatively minor modifications to combustion bowl and/or rim geometry can have significant effects on the type and relative proportions of combustion products. Due to this lack of sufficient understanding, the art provides relatively little guidance on how to achieve any specific set of goals. Engineers have discovered many different variables which they know will have some effect on emissions and/or efficiency, but the grouping of these variables and other factors do not often result in satisfactory and predictable results. Developing a suitable design often requires years of research and development including thorough application, testing and field analysis. One specialized piston design is known from U.S. Pat. No. 7,025,031 to Mahakul et al.

SUMMARY

In one aspect, a piston is provided, for reduced production of particulate matter during combustion of a fuel directly injected after a top dead center position of the piston in an engine cycle into a cylinder bore about 265 mm in diameter in a compression ignition internal combustion engine. The piston includes a piston body defining a longitudinal axis extending between a first axial body end and a second axial body end, and including an outer body surface extending between the first and second axial body ends and defining a piston body diameter of about 263 mm, and a combustion face upon the first axial body end. The combustion face includes a convex inner bowl surface and a concave outer bowl surface together forming a combustion bowl, and an outer rim surface and an inner rim surface together forming an annular piston rim extending circumferentially around the combustion bowl. The annular piston rim defines a plane extending through an intersection of the outer and inner rim surfaces and oriented normal to the longitudinal axis. The combustion bowl has a horizontal diameter, and a vertical depth from the plane such that a ratio of the diameter to the depth is about 7:1, and the concave outer bowl surface defines a radius of curvature fitting the concave outer bowl surface to the depth and diameter such that a profile of the combustion bowl is uniformly curved radially outward of the convex inner bowl surface, and non-reentrant. The inner and outer rim surfaces together comprise a horizontal width of the annular rim in a ratio of inner rim surface width to outer rim surface width from about 1:1 to about 2:1. The inner rim surface includes a chamfer sloping vertically downward from the plane at a chamfer angle from about 9° to about 11°, such that a profile of the annular rim is uniformly linear radially inward of the outer rim surface, and relieved to limit deflection by the piston of the directly injected fuel toward a wall of the cylinder bore.

In another aspect, an internal combustion engine includes an engine housing having formed therein a cylinder bore having an inner wall defining a cylinder bore diameter of about 265 mm, and a fuel injector positioned at least partially within the cylinder bore and configured to directly inject a fuel therein. The engine further includes a piston positioned within the cylinder bore and movable from a bottom dead center position to a top dead center position such that a fluid pressure within the cylinder bore is increased by a factor of about fifteen or greater to autoignite the directly injected fuel with air. The piston further includes a combustion face having a convex inner bowl surface and a concave outer bowl surface together forming a combustion bowl, and an outer rim surface and an inner rim surface together forming an annular piston rim extending circumferentially around the combustion bowl. The annular piston rim defines a plane extending through an intersection of the outer and inner rim surfaces and oriented normal to the longitudinal axis. The combustion bowl has a horizontal diameter, and a vertical depth from the plane such that a ratio of the bowl diameter to the bowl depth is about 7:1. The concave outer bowl surface defines a radius of curvature fitting the concave outer bowl surface to the depth and diameter and forming a non-reentrant profile of the combustion bowl. The inner and outer rim surfaces together comprise a horizontal width of the annular rim in a ratio of inner rim surface width to outer rim surface width from about 1:1 to about 2:1. The inner rim surface includes a chamfer sloping vertically downward from the plane at a chamfer angle from about 9° to about 11° and forming a relieved profile of the annular rim.

In still another aspect, a method of operating an internal combustion engine includes rotating a crankshaft of the internal combustion engine in an engine cycle such that a piston coupled with the crankshaft is moved between a bottom dead center position and a top dead center position within a cylinder bore having a cylinder bore diameter of about 265 mm. The method further includes injecting a fuel directly into the cylinder bore such that at least some of the fuel is injected after the piston has passed the top dead center position in the engine cycle. The method still further includes positioning the piston via the rotation of the crankshaft such that a chamfered inner rim surface of the piston sloping at a chamfer angle from about 9° to about 11° is within a spray path of fuel injected after the piston has passed the top dead center position. The method still further includes directing fuel injected after the piston has passed the top dead center position into a combustion bowl of the piston having a bowl diameter to bowl depth ratio of about 7:1 at least in part via impingement upon the chamfered inner rim surface, such that deflection of the injected fuel by the piston toward a wall of the cylinder bore is limited. The method still further includes autoigniting a mixture containing the injected fuel and air within the cylinder bore.

BRIEF DESCRIPTION OF THE DRAWINGS

FIG. 4 is a sectioned side diagrammatic view of a known piston shown as it might appear interacting with fuel spray plumes from a fuel injector in an engine cycle; and FIG. 5 is a sectioned side diagrammatic view of a piston according to the present disclosure shown as it might appear interacting with fuel spray plumes from a fuel injector in an engine cycle.

DETAILED DESCRIPTION

Figure 1:
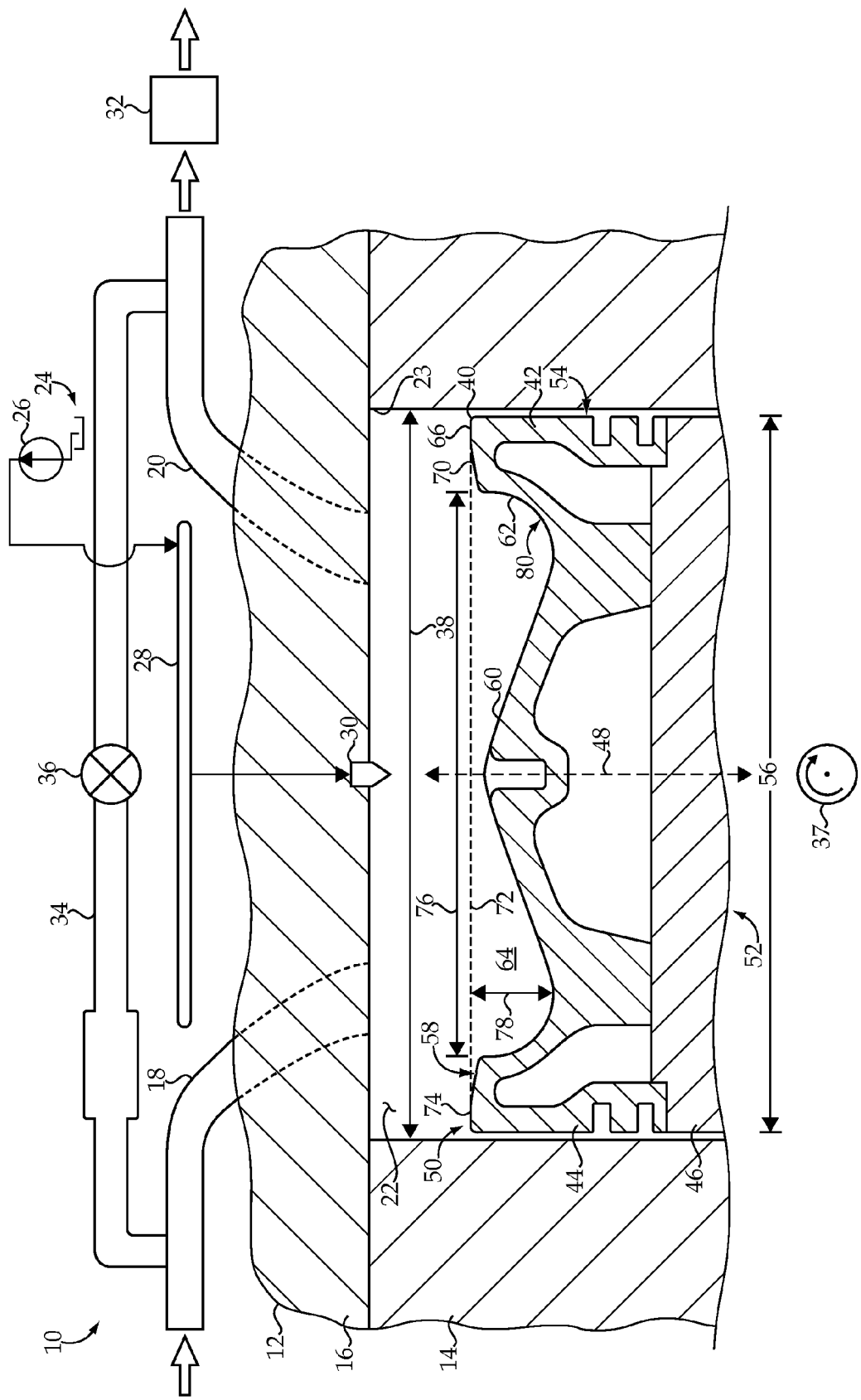
FIG. 1 is a partially sectioned side diagrammatic view of an engine system, according to one embodiment.

Referring to FIG. 1, there is shown an engine system 10 including a compression ignition internal combustion engine 12, according to one embodiment. Engine 12 may include an engine housing 14 having a plurality of cylinder bores formed therein, one of which is shown and identified via reference numeral 22. Engine 12 further includes a cylinder head 16 coupled with engine housing 14 in a conventional manner and having an intake conduit 18 and an exhaust conduit 20 formed therein and each in fluid communication with cylinder bore 22. Engine 12 may include a direct injection engine, and to this end includes a fuel system 24 having a fuel injector 30 positioned at least partially within cylinder bore 22 and configured to directly inject a fuel therein. Fuel system 24 may be a relatively high pressure common rail fuel system, including a high pressure pump 26 configured to supply pressurized liquid fuel, such as liquid diesel distillate, to a common rail 28 supplying fuel injector 30.

In a practical implementation multi-cylinder strategy, common rail 28 will supply the pressurized fuel to a plurality of fuel injectors 30 each positioned at least partially within one of a plurality of cylinder bores in engine housing 14, wherein substantially identical pistons are positioned, as further discussed herein. Fuel injection pressures may be about 200 MPa, or potentially even greater. Engine 12 might include a total of 12 or 16 cylinder bores in certain embodiments, and have a rated power output of about 4600 horsepower. Although the present disclosure is not thereby limited, engine system 10 may be adapted for service applications where engine 12 is kept running virtually all the time, such as locomotive and certain marine applications, and will typically be configured to power a generator such that engine system 10 forms part of a so-called genset on board the locomotive, marine vessel, etc.

As alluded to above, in recent years certain restrictions have been placed and/or increased upon internal combustion engines used in various environments, and to this end engine system 10 may be specially configured for reduced production of certain exhaust emissions during operation, notably particulate matter and nitrogen oxides or NOx. To this end, engine system 10 may also be equipped with an exhaust gas recirculation loop 34 connecting fluidly between intake conduit 18 and exhaust conduit 20, and having an exhaust gas recirculation valve 36 therein. Engine system 10 is also adapted by way of the relatively high fuel injection pressure, a selective catalytic reduction (SCR) module 32 positioned to receive exhaust gases from exhaust conduit 20, and still other features, for the reduced production of exhaust emissions noted above. In addition to features of engine system 10 such as EGR loop 34, fuel system 24, and SCR module 32, engine hardware and notably shape of surfaces directly exposed to the combustion process in cylinder bore 22 assist in satisfying emissions goals, in a manner that will be apparent from the following description.

To this end, engine 12 further includes a piston 40 positioned within cylinder bore 22 and movable between a bottom dead center position and a top dead center position such that a fluid pressure within cylinder bore 22 is increased by a factor of about fifteen or greater to autoignite fuel directly injected therein with air. A compression ratio of engine 12 may be about 15.9:1. Piston 40 may be coupled with a crankshaft 37 rotatable in a conventional manner 37 to move piston 40 between its top and bottom dead center positions. In contrast to certain other engine operating strategies and configurations, piston 40 may be specially adapted for reduced production of particulate matter during combustion of fuel directly injected after a top dead center position of piston 40 in an engine cycle. Piston 40 may be further specially configured for service in a cylinder bore about 265 millimeters (mm) in diameter, shown via cylinder bore diameter dimension 38 in FIG. 1.

Piston 40 may include a piston body 42 defining a longitudinal axis 48 extending between a first axial body end 50 and a second axial body end 52. Piston 42 may further include an outer body surface 54 extending between the first and second axial body ends 50 and 52 and defining a piston body diameter 56 of about 263 mm. Piston body 42 further includes a combustion face 58 upon first axial body end 50. In a practical implementation strategy piston 40 may be configured as a two-piece piston having a crown 44 attached to a skirt 46, although one-piece piston bodies might also fall within the scope of the present disclosure. In a practical implementation strategy, piston 40 will be equipped with piston rings and reciprocates between its bottom dead center position and top dead center position within a cylinder bore defined by a cylinder liner, although neither piston rings nor a cylinder liner nor certain other features of engine 12 are shown in FIG. 1.

Combustion face 58 includes a convex inner bowl surface 60 and a concave outer bowl surface 62 together forming a combustion bowl 64. Combustion face 58 further includes an outer rim surface 66 and an inner rim surface 68 together forming an annular piston rim 70 extending circumferentially around combustion bowl 64. Surfaces 66 and 68 define a plane 72 extending through an intersection 74 of outer and inner rim surfaces 66 and 68 and oriented normal to longitudinal axis 48. Piston 40 is depicted within engine 12 in FIG. 1 in a section plane that includes longitudinal axis 48. It should be appreciated that the profile of piston 40, and combustion face 58, shown in FIG. 1 is a profile of rotation, such that the profile would appear the same at any angular orientation about longitudinal axis 48 and taken in an analogous section plane. As alluded to above, certain features of piston 40, and notably a shape of combustion face 58 are specially adapted to participate in the distribution, directing of, and mixing of directly injected fuel, air and potentially exhaust gases delivered via EGR loop 34, during the combustion process. As will be further apparent from the following description, relative proportions, shapes, sizes, angular relationships and other geometric attributes of combustion face 58 make the attainment of reduced production of particulate matter goals possible, and in particular satisfying or even exceeding requirements of so-called Tier IV Final for engines of the type and power classification into which engine system 10 falls.

Combustion bowl 64 has a horizontal diameter 76, and a vertical depth 78 from plane 72 such that a ratio of diameter 76 to depth 78 is about 7:1. More particularly, this ratio may be about 6.97:1 to about 6.99:1. Those skilled in the art will appreciate that such a ratio of bowl diameter to depth is relatively wide and shallow as compared to certain known piston bowl designs. Outer bowl surface 62 may further define a radius of curvature 80 fitting outer bowl surface 62 to depth 78 and diameter 76 such that a profile of combustion bowl 64 is uniformly curved radially outward of inner bowl surface 60, and non-reentrant. The curvature is uniform in a radial direction, as shown in FIG. 1, and also in a circumferential, rotational direction. Another way to understand this feature, is that radius 80 shapes combustion face 58 so that outer bowl surface 62 can smoothly transition from inner bowl surface 60 in an outward direction, and requires essentially no variation in the curvature of bowl 64 to attain the desired bowl to bore ratio, and having a non-reentrant shape so that bowl 64, near where combustion face 58 transitions between bowl 64 and rim 70, does not extend past a vertical orientation. Those skilled in the art will also appreciate various differences that can be associated with reentrant versus non-reentrant combustion bowls, particularly in the context of direct injection compression ignition, as the resulting differing flow of gases and injected fuel during combustion can result in different combustion properties.

Figure 2:
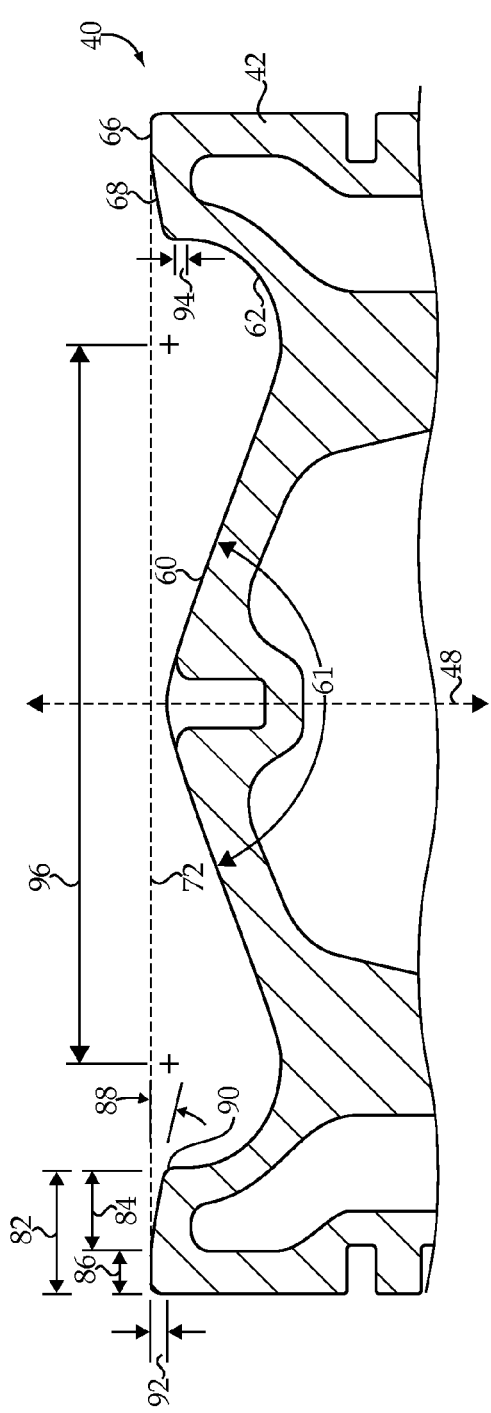
FIG. 2 is a sectioned side view of a piston according to one embodiment.

Referring also now to FIG. 2, inner rim surface 68 and outer rim surface 66 together comprise a horizontal width 82 of annular rim 70 in a ratio of inner rim surface width 84 to outer rim surface width 86. Stated another way, a total width of rim 70 is made up by a width of inner rim surface 68 and a width of outer rim surface 66 in a ratio of one to the other. In a practical implementation strategy, the ratio of inner rim surface width 84 to outer rim surface width 86 may be from about 1:1 to about 2:1. More particularly, this ratio may be from about 1.5:1 to about 1.8:1. More particularly still, this ratio may be about 1.52:1 to about 1.78:1. As used herein, the term "about" may generally be understood in a context of conventional rounding to a consistent number of significant digits. Accordingly, "about 265 mm" means from 264.5 mm to 265.4 mm. In the context of ratios disclosed herein, a similar convention applies but rounding only the first quantity in the ratio. In connection with quantities where the term "about" is not used, since no quantity can ever be truly precisely known, those skilled in the art will appreciate that a more restrictive understanding can be applied. For instance, since "about 1:1" should be understood to mean from 0.5:1.0 to 1.4:1.0, the term 1:1 by itself without the term "about" should be more narrowly construed.

Inner rim surface 68 may further include a chamfer sloping vertically downward from plane 72 at a chamfer angle 88 from about 9° to about 11°, such that a profile of annular rim 70 is uniformly linear radially inward of outer rim surface 66, and relieved to limit deflection by piston 40 of directly injected fuel toward a wall 23 of cylinder bore 22. "Relieved" refers to the profile attained by the removal of material from what would otherwise be a substantially right angled corner at the intersection of rim 70 and bowl 64. As will be further apparent from the following description, the features of rim 70 in conjunction with features of combustion bowl 64 and other features of engine 12 limit deflecting of fuel into contact with wall 23, so that the fuel can participate in the combustion process, and the phenomenon known in the art as "wall wetting" is generally avoided. This results in reduced smoke from liquid fuel contacting the relatively cool wall 23 or otherwise failing to completely combust, and also reduces soot and the like accumulating in the engine oil which typically flows between housing 14 and piston 40 during operation in a well known manner.

Combustion face 58 may further include an annular lip surface 90 transitioning between inner rim surface 68 and concave outer bowl surface 62. Inner rim surface 68 may slope a vertical distance 92, in other words a chamfer slope distance, from plane 72 to annular lip surface 90. In a practical implementation strategy, inner rim surface width 84 may be greater than vertical distance 92 by a factor of about five or greater. Transitioning further inward from lip surface 90, while concave outer bowl surface 62 may be fairly understood as having an overall concave shape, a relatively small vertical or straight wall portion of surface 62 may adjoin lip surface 90, and have a straight wall height 94. Straight wall height 94 might be about 2 mm in certain embodiments. Also shown in FIG. 2 is a floor angle 61 defined by convex inner rim surface 60. In a practical implementation strategy, floor angle may be about 142°. Also in a practical implementation strategy radius of curvature 80 may be less than vertical depth 78 of combustion bowl 64. Diameter 76 may be greater than radius 80 by a factor of about nine or greater. More particularly, radius 80 may be about 20 mm, depth 78 may be about 30 mm, and diameter 76 may be about 210 mm. More particularly still, radius 80 may be 23.36 mm, depth 78 may be 30.03 mm, and diameter 76 may be 209.5 mm. In relation to features associated with rim 70, in a practical implementation strategy vertical distance 92 may be about 3 mm, and inner rim surface width 84 may be about 17 mm. Outer rim surface width 86 may be about 10 mm. As can be seen from FIG. 2, outer rim surface 66 may be planar, such that plane 72 passes through intersection 74, but is also substantially coplanar with outer rim surface 66 itself. A center to center distance 96 between centers of circles defined by concave outer bowl surface 66, in other words circles having as a radius radius 80, may be about 163 mm in a practical implementation strategy. The centers of those circles separated by distance 96 may be below plane 72, such as by about 6.7 mm. An overall volume of combustion bowl 64 may be about 813 $cm^3$, excluding the bore (not numbered) through convex inner bowl surface 60.

Figure 3:
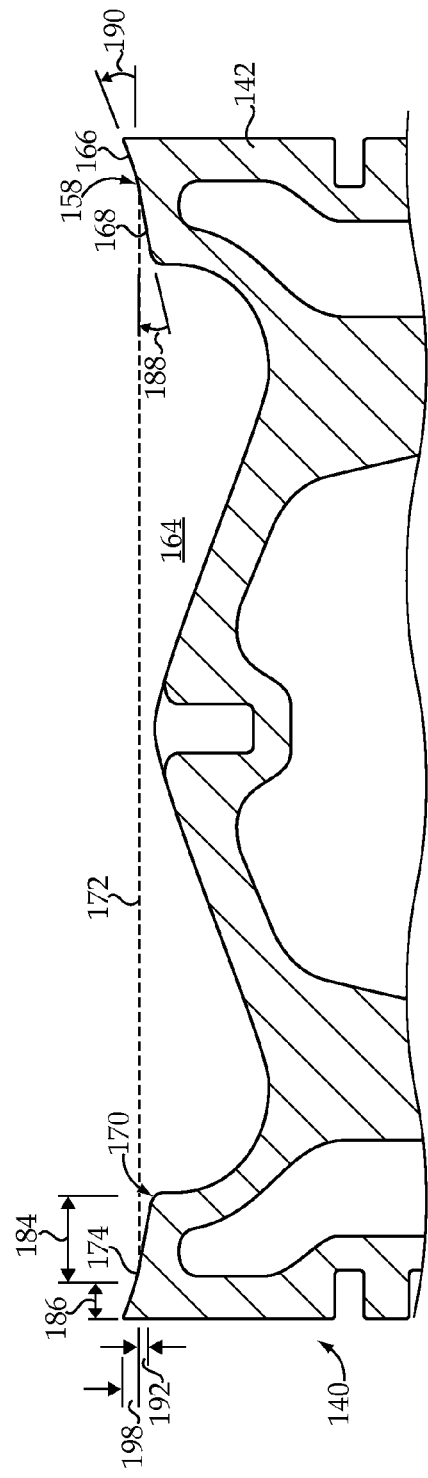
FIG. 3 is a sectioned side view of a piston according to another embodiment.

As noted above, outer rim surface 66 may be planar. Referring now to FIG. 3, in an alternative embodiment pistons contemplated within the scope of the present disclosure may have an outer rim surface which is itself of a generally chamfered form, in contrast to being planar. In FIG. 3, a piston 140 includes a piston body 142 having a combustion face 158 defining a combustion bowl 164. Combustion face 158 also includes an outer rim surface 166 and an inner rim surface 168 together forming an annular rim 170 extending circumferentially around combustion bowl 164. Features of combustion bowl 164, and for that matter features of piston 140 not otherwise discussed herein as being distinct, may be understood to be substantially identical to those discussed and illustrated in connection with piston 40 above. In the FIG. 3 embodiment, outer rim surface 166 and inner rim surface 168 can be understood to together make up a horizontal width of rim 170 in a ratio of inner rim surface width 184 to outer rim surface width 186. Rim 170 defines a plane 172 extending through an intersection 174 of rim surfaces 166 and 168. Inner rim surface 168 may include a chamfer sloping vertically downward from plane 172 at a chamfer angle 188 which may be the same as the chamfer angle and angular ranges discussed in connection with piston 42 above. A ratio of inner rim surface width 184 to outer rim surface width 186 may be the same as that discussed in connection with piston 42 as well. Inner rim surface 168 may also slope vertically downward at a chamfer angle 188 and for a vertical distance 192 from plane 172 which may be generally analogous to and the same as angle 88 and distance 92 in piston 42. In contrast to piston 42, outer rim surface 166 may slope vertically upward at a second angle 190 greater than angle 188 from intersection 174 toward an outer body surface of piston 142. A vertical distance by which surface 166 rises from plane 172 is shown via reference numeral 198, and may be about 3 mm. The rim shape in piston 140 may impart similar advantages to that of piston 40 respecting reduced production of particulate matter. The upward sloping configuration of outer rim surface 166 can also position additional rim surface at an orientation assisting in limiting wall wetting, and also reducing a so-called squish volume between the piston and cylinder head to limit volume in bore 22 where incomplete combustion tends to occur.

INDUSTRIAL APPLICABILITY

As discussed above, various geometric features of pistons and compression ignition internal combustion engines, as well as engine operating conditions and strategies, can impact efficiency and emissions. The particular effects of many of these parameters are relatively poorly understood, and the cross coupling of the parameters often means that toggling any individual one can have unpredictable consequences. Compounding these challenges are certain variations in engine design and operation from manufacturer to manufacturer that may not be specifically intended to address efficiency and/or emissions, but which create fixed external restrictions on how any particular engine or piston can be configured, and therefore limit the design options available. It will be recalled that engine 10 may be operated with relatively high fuel injection pressures, and exhaust gas recirculation, for the purposes of reducing certain emissions. Exhaust gas recirculation tends to cool combustion temperatures, reducing NOx, but may also increase an amount of particulate matter or soot produced via the combustion. An additional strategy for NOx reduction employed in engine 10 includes retarded injection timing, where fuel injection occurs for some time after piston 40 has reached and passed its top dead center position in an engine cycle. In a practical implementation strategy, injection may commence about 2° before the top dead center position, and continue until about 7 or 8° of crank angle after the top dead center position. This is considered to have the result of diffusion burning predominating, as opposed to homogeneous charge compression ignition, and also is associated with reduced NOx production. Both of these strategies, retarded injection timing and exhaust gas recirculation, can have the beneficial effect of reducing NOx, but also potentially increase the production of particulate matter. The relatively higher injection pressures can promote relatively complete burning of injected fuel via greater fuel spray atomization, potentially reducing particulate matter, but also increase a depth of penetration of fuel spray, which can cause or exacerbate so called wall wetting or other issues, leading to increased production of particulate matter.

The present instance thus represents a scenario where engineers were faced with the challenge of improving emissions for an existing engine platform having a number of fixed, external constraints such as bore size, and generally engine compression ratio. Since redesigning the cylinder bore and substantially altering compression ratio were undesirable options, extensive experimentation with the geometry of the combustion bowl was undertaken. It was ultimately determined that exhaust gas recirculation, retarded injection timing, and certain other minor modifications from the prior engine platform could theoretically reduce NOx enough to satisfy Tier IV Final requirements. These strategies could only be implemented, however, if their potential adverse effects on particulate matter production could be addressed. With a combustion bowl and rim design that prevents deflection of the fuel spray towards the cylinder wall, it was discovered that the desired emissions profile could be attained or even exceeded without making otherwise undesirable or impractical modifications to the existing engine platform. This was due at least in part to the insight that a relatively wider combustion bowl could be simulated by removing a relatively small amount of material adjacent an edge of the combustion bowl to enable fuel spray to be pushed or directed back towards the center of the cylinder bore, and diverted into the combustion bowl rather than being deflected towards the cylinder bore wall. These principles will be further evident from the following discussion of an example existing strategy in comparison with the present disclosure.

Referring now to FIG. 4, there is shown a known piston 240 having a combustion bowl 264 surrounded by a flat piston rim 270. A fuel injector 230 is shown as it might appear spraying fuel in a fuel spray plume 275 having a generally centrally located axis 277 in the plume. In FIG. 4, it may be noted that axis 277 deflects off of rim 270 in such a way that fuel spray plume 274, or a portion thereof, bounces off of rim 270 and towards the wall of a cylinder bore within which piston 240 is positioned. In contrast, FIG. 5 illustrates piston 40 as it might appear where a fuel spray plume 75 having a center axis 77 has been injected, and is near a point in the engine cycle at which injection will cease, where piston 40 is at a few degrees past top dead center position, for instance. It may be noted that a center axis 77 of fuel spray plume 75 deflects off of rim 70, and returns to combustion bowl 64. In this general manner, little if any fuel spray can be expected to bounce towards the cylinder bore wall, and instead fuel will be directed into combustion bowl 64. At the state depicted in FIG. 5, piston 40 is moving downward, which movement may assist in facilitating the desired directing of fuel spray. Crankshaft 37 will of course be rotating while piston 40 is moved between its top dead center position and bottom dead center position as in FIG. 5. The fuel injected in fuel spray plumes 75 directly into the cylinder bore will be injected such that at least some of the fuel is injected after piston 40 has passed its top dead center position. The rotation of crankshaft 37 will thus tend to position piston 40 such that inner rim surface 68 is oriented to divert or assist in diverting fuel spray as in FIG. 5 to prevent its being deflected towards and ultimately impinging upon cylinder wall 23. In other words, rotation of crankshaft 37 and the consequent linking of crank angle to piston position enables inner rim surface 68 to be positioned within a spray path of the fuel injected after piston 40 has passed its top dead center position. During the injection of the fuel, spray plume 75 may be autoigniting with air in cylinder bore 22. A spray angle 81 defined by fuel spray plumes 75 in FIG. 5 may be about 140°.

It will be recalled that combustion bowl 64 may be thought of as simulating a wider bowl. While a wider bowl might overcome the problems illustrated in FIG. 4, a wider bowl could also be expected to introduce other problems, uncertainties, or complications into the piston and/or engine design process. One such complication would be an effect on combustion bowl volume, which in turn affects compression ratio. In other words, while it might have been a viable strategy from the standpoint of controlling where fuel spray goes within a cylinder to utilize a wider combustion bowl, such a strategy was disfavored at least in part due to the expected effect on compression ratio. Other changes in piston or cylinder head design, or even stroke distance, would have likely been necessary to compensate for a changed compression ratio. Instead compression ratio change from the prior platform is reduced only slightly.

Those skilled in the art will thus appreciate that the attempts to satisfy emissions goals in engine 10 could have taken a number of different paths, including attempts to use a relatively larger combustion bowl, attempts to utilize reentrancy, variable valve timing, or any of a variety of other strategies. It was therefore only upon developing a design such as a chamfered inner rim surface to control fuel spray direction and deflection from among any number of other potentially viable options that the theoretical possibility of optimizing the chamfered inner rim surface and other piston features even presented themselves. In the present case, it was discovered that the combination of retarded injection timing, injection spray angle, general piston size, and still other factors lent itself to inner rim surface to outer rim surface width ratios, combustion bowl diameter to depth ratios, and inner rim surface geometry that are presented as optimal strategies herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A piston, for reduced production of particulate matter during combustion of a fuel directly injected after a top dead center position of the piston in an engine cycle into a cylinder bore about 265 mm in diameter in a compression ignition internal combustion engine, the piston comprising:
 a piston body defining a longitudinal axis extending between a first axial body end and a second axial body end, and including an outer body surface extending between the first and second axial body ends and defining a piston body diameter of about 263 mm, and a combustion face upon the first axial body end;
 the combustion face including a convex inner bowl surface and a concave outer bowl surface together forming a combustion bowl, and an outer rim surface and an inner rim surface together forming an annular piston rim extending circumferentially around the combustion bowl and defining a plane extending through an intersection of the outer and inner rim surfaces and oriented normal to the longitudinal axis;
 the combustion bowl having a horizontal diameter, and a vertical depth from the plane such that a ratio of the diameter to the depth is about 7:1, and the concave outer bowl surface defining a radius of curvature fitting the concave outer bowl surface to the depth and diameter such that a profile of the combustion bowl is uniformly curved radially outward of the convex inner bowl surface, and non-reentrant; and
 the inner and outer rim surfaces together comprising a horizontal width of the annular rim in a ratio of inner rim surface width to outer rim surface width from about 1:1 to about 2:1, the inner rim surface including a chamfer sloping vertically downward from the plane at a chamfer angle from about 9° to about 11°, such that a profile of the annular rim is uniformly linear radially inward of the outer rim surface, and relieved to limit deflection by the piston of the directly injected fuel toward a wall of the cylinder bore, and the outer rim surface sloping vertically upward at an angle greater than the chamfer angle.

2. The piston of claim 1 wherein the ratio of inner rim surface width to outer rim surface width is from about 1.5:1 to about 1.8:1.

3. The piston of claim 2 wherein the combustion face further includes an annular lip surface transitioning between the inner rim surface and the concave outer bowl surface, and wherein the inner rim surface slopes a vertical distance from the plane to the annular lip surface, and the inner rim surface width is greater than the vertical distance by a factor of about five or greater.

4. The piston of claim 3 wherein the vertical distance is about 3 mm and the inner rim surface width is about 17 mm.

5. The piston of claim 2 wherein the inner rim surface width is about 17 mm and the outer rim surface width is about 10 mm.

6. The piston of claim 2 wherein the chamfer angle of the inner rim surface is about 10°.

7. The piston of claim 1 wherein the radius of curvature defined by the concave outer bowl surface is less than the depth of the combustion bowl, and the diameter of the combustion bowl is greater than the radius of curvature by a factor of about nine or greater.

8. The piston of claim 7 wherein the radius of curvature is about 20 mm, the depth is about 30 mm, and the diameter is about 210 mm.

9. The piston of claim 8 wherein the radius of curvature is 23.36 mm, the depth is 30.03 mm, and the diameter of the combustion bowl is 209.5 mm.

10. An internal combustion engine comprising:
 an engine housing having formed therein a cylinder bore including an inner wall defining a cylinder bore diameter of about 265 mm;
 a fuel injector positioned at least partially within the cylinder bore and configured to directly inject a fuel therein;
 a piston positioned within the cylinder bore and movable from a bottom dead center position to a top dead center position such that a fluid pressure within the cylinder bore is increased by a factor of about fifteen or greater to autoignite the directly injected fuel with air;

the piston including a combustion face having a convex inner bowl surface and a concave outer bowl surface together forming a combustion bowl, and an outer rim surface and an inner rim surface together forming an annular piston rim extending circumferentially around the combustion bowl and defining a plane extending through an intersection of the outer and inner rim surfaces and oriented normal to a longitudinal axis extending between a first axial body end and a second axial body end of a piston body;

the combustion bowl having a horizontal diameter, and a vertical depth from the plane such that a ratio of the bowl diameter to the bowl depth is about 7:1, and the concave outer bowl surface defining a radius of curvature fitting the concave outer bowl surface to the depth and diameter and forming a non-reentrant profile of the combustion bowl; and the inner and outer rim surfaces together comprising a horizontal width of the annular rim in a ratio of inner rim surface width to outer rim surface width from about 1:1 to about 2:1, the inner rim surface including a chamfer sloping vertically downward from the plane at a chamfer angle from about 9° to about 11° and forming a relieved profile of the annular rim, and the outer rim surface slopes upward at a second angle greater than the chamfer angle.

11. The engine of claim 10 wherein the diameter of the combustion bowl is about 210 mm, the depth of the combustion bowl is about 30 mm, and the radius of curvature is about 20 mm.

12. The engine of claim 11 wherein the ratio of inner rim surface width to outer rim surface width is from about 1.5:1 to about 1.8:1.

13. The engine of claim 12 wherein the chamfer angle is about 10°.

14. A method of operating an internal combustion engine comprising the steps of:

rotating a crankshaft of the internal combustion engine in an engine cycle such that a piston coupled with the crankshaft is moved between a bottom dead center position and a top dead center position within a cylinder bore having a cylinder bore diameter of about 265 mm;

injecting a fuel directly into the cylinder bore such that at least some of the fuel is injected after the piston has passed the top dead center position in the engine cycle;

positioning the piston via the rotation of the crankshaft such that a chamfered inner rim surface of the piston sloping at a chamfer angle from about 9° to about 11° is within a spray path of fuel injected after the piston has passed the top dead center position and such that an outer rim surface slopes upward at a second angle greater than the chamfer angle;

directing fuel injected after the piston has passed the top dead center position into a combustion bowl of the piston having a bowl diameter to bowl depth ratio of about 7:1 at least in part via impingement upon the chamfered inner rim surface, such that deflection of the injected fuel by the piston toward a wall of the cylinder bore is limited; and autoigniting a mixture containing the injected fuel and air within the cylinder bore.

15. The method of claim 14, further comprising positioning the inner rim surface and the outer rim surface such that the ratio of inner rim surface width to outer rim surface width is from about 1.5:1 to about 1.8:1.

16. The method of claim 14, further comprising positioning an annular lip surface to transition between the inner rim surface and an concave outer bowl surface, such that the inner rim surface slopes a vertical distance from a plane to the annular lip surface, and such that an inner rim surface width is greater than the vertical distance by a factor of about five or greater.

17. The method of claim 16, wherein the vertical distance is about 3 mm and the inner rim surface width is about 17 mm.

18. The method of claim 16, wherein the inner rim surface width is about 17 mm and an outer rim surface width is about 10 mm.

19. The method of claim 14, wherein the chamfer angle of the inner rim surface is about 10°.

20. The method of claim 14, further comprising positioning a concave outer bowl surface of a combustion face of the piston such that a profile of a combustion bowl is uniformly curved radially outward of a convex inner bowl surface of the combustion face.

* * * * *